United States Patent
Ito et al.

(10) Patent No.: US 10,059,544 B2
(45) Date of Patent: Aug. 28, 2018

(54) MEDIA CONVEYOR MECHANISM FOR PRINTING APPARATUS AND METHOD OF MOUNTING CONVEYOR BELT

(71) Applicant: MIMAKI ENGINEERING CO., LTD., Nagano (JP)

(72) Inventors: Shin Ito, Nagano (JP); Tomohiro Takano, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/671,149

(22) Filed: Aug. 8, 2017

(65) Prior Publication Data

US 2018/0037428 A1 Feb. 8, 2018

(30) Foreign Application Priority Data

Aug. 8, 2016 (JP) ................. 2016-155911

(51) Int. Cl.
| | |
|---|---|
| B65G 23/00 | (2006.01) |
| B65G 23/44 | (2006.01) |
| B65G 23/02 | (2006.01) |
| B65H 5/02 | (2006.01) |
| B65H 7/02 | (2006.01) |

(52) U.S. Cl.
CPC ............ *B65H 5/025* (2013.01); *B65G 23/44* (2013.01); *B65H 7/02* (2013.01); *B65H 2404/251* (2013.01); *B65H 2404/256* (2013.01); *B65H 2511/22* (2013.01)

(58) Field of Classification Search
None
See application file for complete search history.

(56) References Cited

U.S. PATENT DOCUMENTS

| | | | | |
|---|---|---|---|---|
| 5,784,676 A | * | 7/1998 | Iseki ................. | G03G 15/1655 347/116 |
| 8,602,208 B2 | * | 12/2013 | Tachiki ............. | G03G 15/1615 198/813 |
| 8,807,331 B2 | * | 8/2014 | Beltman ............ | B65G 23/44 198/806 |
| 2008/0044211 A1 | | 2/2008 | Otomo et al. | |

FOREIGN PATENT DOCUMENTS

JP 2013-086343 5/2013

OTHER PUBLICATIONS

"Search Report of Europe Counterpart Application", dated Dec. 19, 2017, p. 1-p. 8.

* cited by examiner

*Primary Examiner* — Kavel Singh
(74) *Attorney, Agent, or Firm* — JCIPRNET (57) ABSTRACT

A media conveyor mechanism for a printing apparatus includes an endless conveyor belt (BT) conveying a medium (M) in a Y direction; a belt driving unit having a first roller and a second roller which are arranged at an interval in the Y direction and parallel to an X direction, on which the conveyor belt (BT) is wrapped, and at least one of which drives the conveyor belt (BT), the first roller being fixed at a predetermined position in the Y direction, and second roller being switchable between a movable state and a fixed state; and an applying unit which applies constant equal force to both ends of the second roller in the X direction in a −Y direction.

3 Claims, 9 Drawing Sheets

MEDIA CONVEYOR MECHANISM FOR PRINTING APPARATUS AND METHOD OF MOUNTING CONVEYOR BELT

CROSS REFERENCE TO RELATED APPLICATIONS

This application claims the priority benefit of Japanese Patent Application No. 2016-155911, filed on Aug. 8, 2016. The entirety of the above-mentioned patent application is hereby incorporated by reference herein and made a part of this specification.

TECHNICAL FIELD

The present disclosure relates to a media conveyor mechanism for a printing apparatus and a method of mounting a conveyor belt.

DESCRIPTION OF THE BACKGROUND ART

A printing apparatus having a media conveyor mechanism configured to convey a medium such as paper by a conveyor belt is known (for example, Japanese Unexamined Patent Publication No. 2013-86343).

SUMMARY

The conveyor belt described in Japanese Unexamined Patent Publication No. 2013-86343 and the like is mounted in a state in which tension is applied across two rollers. However, when the conveyor belt is mounted between the two rollers, if the tensions applied to one end side and the other end side in the width direction of the conveyor belt are different from each other, meandering occurs when the conveyor belt rotationally moves, or deformation of the conveyor belt occurs such that the other end of the conveyor belt in the width direction is longer than one end of the conveyor belt in a moving direction (so-called crown shape).

The present disclosure has been made in consideration of the above problem and provides a media conveyor mechanism for a printing apparatus which can suppress meandering or deformation of a conveyor belt and a method of mounting the conveyor belt.

A media conveyor mechanism for a printing apparatus according to the present disclosure includes: an endless conveyor belt conveying a medium in a first direction; a belt driving unit having a first roller and a second roller which are arranged at an interval in the first direction and parallel to a second direction orthogonal to the first direction, on which the conveyor belt is wrapped, and at least one of which drives the conveyor belt, the first roller being fixed at a predetermined position in the first direction, and the second roller being switchable between a movable state in which the second roller can move in the first direction and a fixed state in which the second roller's position in the first direction is fixed; and an applying unit which applies constant equal force to both ends of the second roller in the second direction in a direction away from the first roller in the first direction.

According to the present disclosure, since the applying unit can apply constant equal force to both ends of the second roller in the second direction in a direction away from the first roller in the first direction, when the conveyor belt is mounted on the first roller and the second roller, tension can be applied to both the ends of the conveyor belt in the second direction by the constant equal force. This makes it possible to suppress meandering or deformation of the conveyor belt.

The applying unit may include an air cylinder mechanism applying the force to the second roller and a regulator adjusting an air pressure of the air cylinder mechanism to a constant pressure.

According to the present disclosure, constant equal force can be more reliably applied to both ends of the second roller in the second direction.

The media conveyor mechanism may further include a third roller which is in contact with a portion of the conveyor belt between the first roller and the second roller and variably applies tension to the conveyor belt.

According to the present disclosure, the tension can be adjusted even when the conveyor belt is deformed in use with time.

Further, the applying unit may further include a detecting unit detecting a magnitude of the force to be added to the second roller.

According to the present disclosure, it is possible to detect whether or not constant equal force is applied to both ends of the second roller in the second direction.

A method of mounting a conveyor belt according to the present disclosure is a method of mounting a conveyor belt which mounts the conveyor belt on the media conveyor mechanism for a printing apparatus including: setting the second roller in the movable state and wrapping the conveyor belt in a loose state between the first roller and the second roller; applying constant equal force to both ends of the second roller in the second direction in a direction away from the first roller in the first direction by the applying unit in a state in which the conveyor belt is wrapped on the second roller; switching the second roller from the movable state to the fixed state while a state in which the force is applied by the applying unit is maintained when predetermined tension is applied to the conveyor belt by applying the force to both the end of the second roller in the second direction; and canceling the state in which the force is applied by the applying unit after the second roller is switched to the fixed state.

According to the present disclosure, since the second roller is switched from the movable state to the fixed state while maintaining the state in which the applying unit applies the constant equal force to both the ends of the second roller in the second direction in the direction away from the first roller in the first direction, the conveyor belt is mounted on the first roller and the second roller in a state in which tension is applied to both the ends in the second direction with constant equal force. This makes it possible to suppress meandering or deformation of the conveyor belt.

According to the present disclosure, meandering or deformation of the conveyor belt can be suppressed.

DETAILED DESCRIPTION OF EMBODIMENT

Hereinafter, an embodiment of a media conveyor mechanism for a printing apparatus and a method of mounting a conveyor belt according to the present disclosure will be described with reference to the accompanying drawings. It should be noted that the present disclosure is not limited to the embodiment. In addition, constituent elements in the following embodiment include elements which can be replaced and easily achieved by a person skilled in the art or substantially the same.

In an embodiment, the directions in the drawings will be described by using an XYZ coordinate system. In the XYZ coordinate system, a plane parallel to the arrangement surface on which a media conveyor mechanism 100 is disposed is defined as an XY plane. In the embodiment, the XY plane is parallel to the horizontal plane. In this XY plane, a direction in which a medium is conveyed is denoted as a Y direction, and a direction orthogonal to a Y direction on the XY plane is denoted as an X direction. The direction perpendicular to the XY plane is denoted as a Z direction. In the embodiment, the Z direction is parallel to the vertical direction. The following explanation will be provided on the assumption that, in each of the X direction, the Y direction, and the Z direction, a direction of an arrow in the drawings is a positive direction and a direction opposite to the direction of the arrow is a negative direction.

Figure 1:
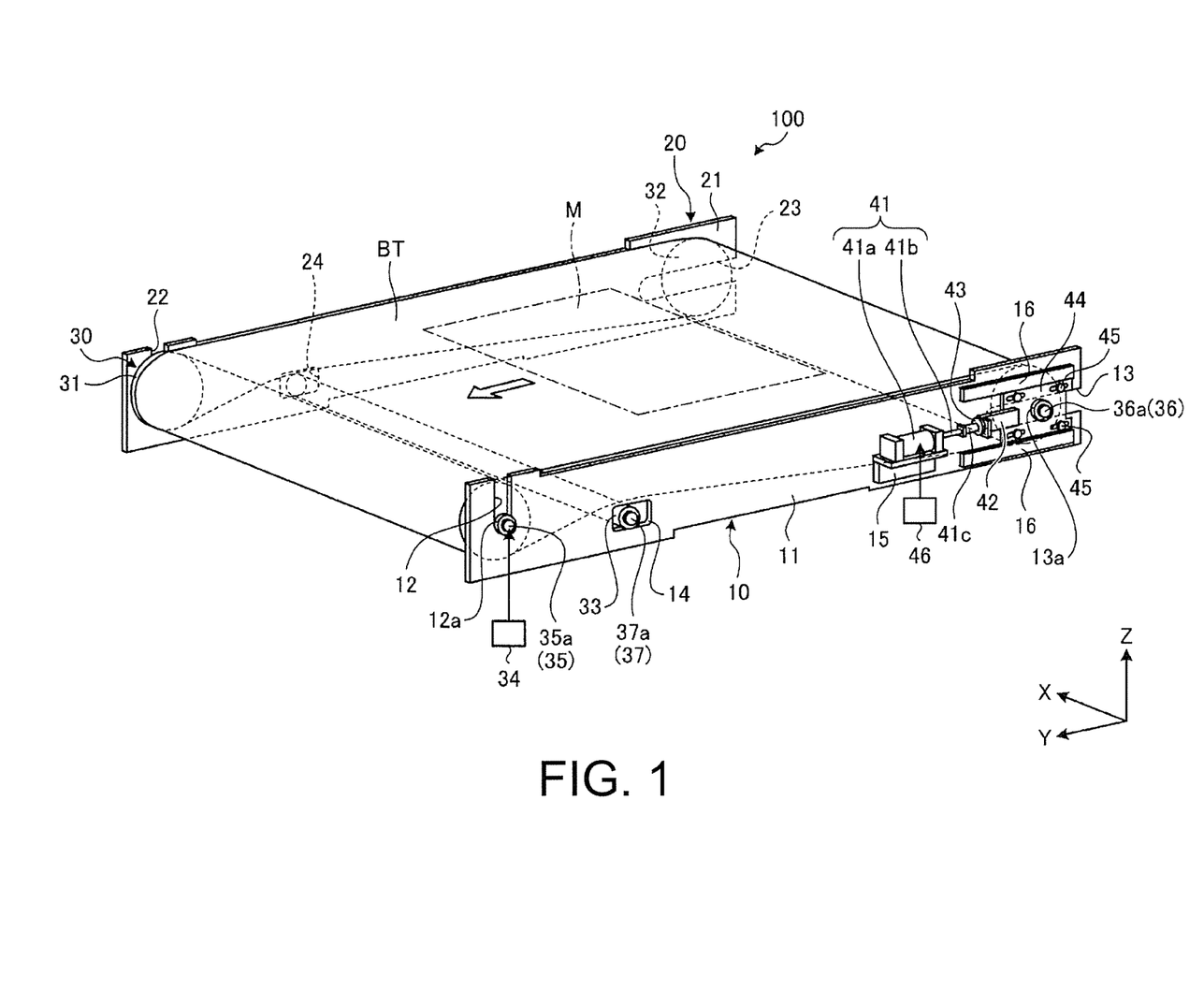
FIG. 1 is a perspective view showing an example of a media conveyor mechanism according to an embodiment.
Figure 2:
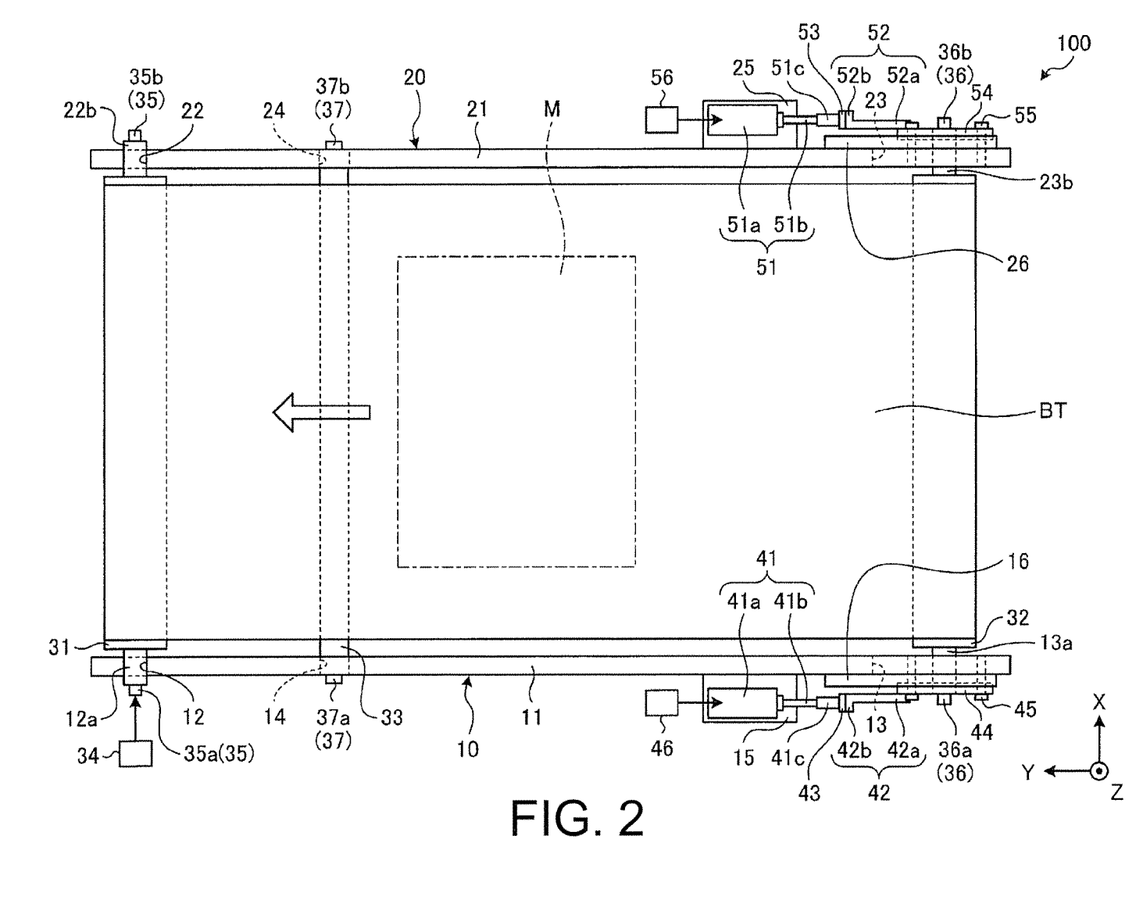
FIG. 2 is a plan view showing an example of the media conveyor mechanism.
Figure 3:
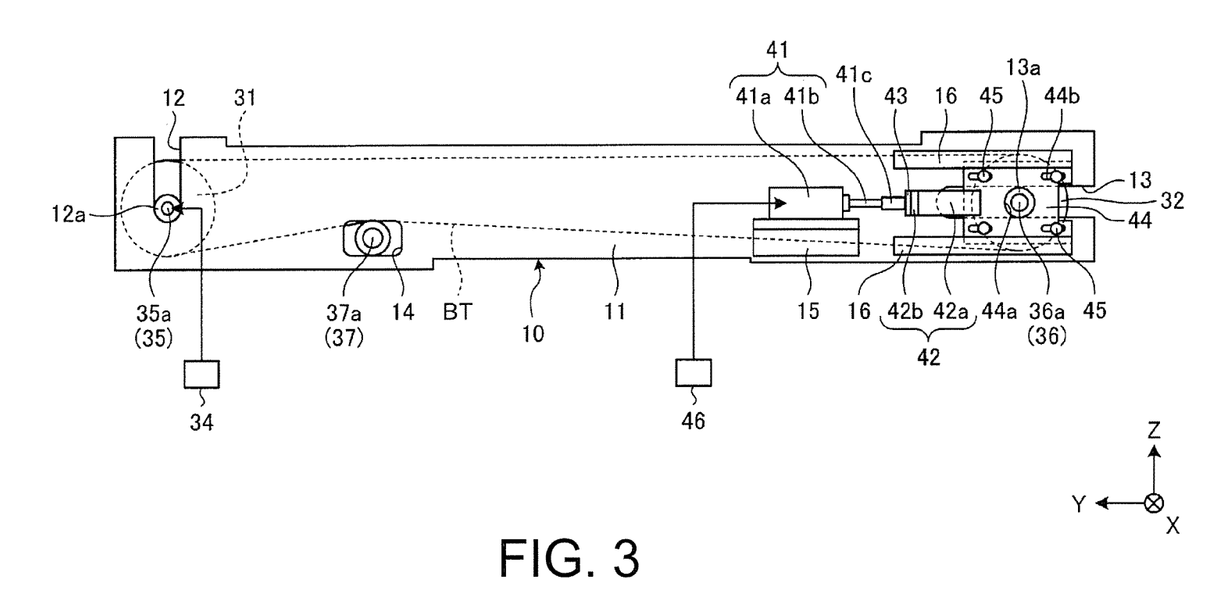
FIG. 3 is a side view showing an example of the media conveyor mechanism.

FIG. 1 is a perspective view showing an example of the media conveyor mechanism 100 according to the embodiment. FIG. 2 is a plan view showing an example of the media conveyor mechanism 100. FIG. 3 is a side view showing an example of the media conveyor mechanism 100. As shown in FIGS. 1 to 3, the media conveyor mechanism 100 includes a conveyor belt BT, body frames 10 and 20, a belt driving unit 30, and applying units 40 and 50. The media conveyor mechanism 100 is mounted on a printing apparatus to conveyor a medium M such as paper. The media conveyor mechanism 100 may be used for a portion (such as a platen) which performs printing on, for example, the medium M.

The conveyor belt BT is formed in an endless shape. The conveyor belt BT is wrapped around a first roller 31 and a second roller 32 of the belt driving unit 30. The conveyor belt BT is supported by the first roller 31 and the second roller 32 so as to be rotatable and movable in a circumferential direction. When the conveyor belt BT is wrapped around the first roller 31 and the second roller 32, a conveyor portion BTa and a return portion BTb are formed. The conveyor portion BTa is a portion on a +Z side with respect to the first roller 31 and the second roller 32. The return portion BTb is a portion on a −Z side with respect to the first roller 31 and the second roller 32. The conveyor belt BT rotationally moves to convey the medium M in a +Y direction (first direction) in a state where the medium M such as paper is placed on the conveyor portion BTa. The conveyor belt BT is formed, for example, in a mesh shape, but it is not limited thereto, and the conveyor belt BT may be in another shape such as a sheet-like shape. When the conveyor belt BT is formed in a mesh shape, the space on a −Z side of the conveyor portion BTa is sucked to make it possible to cause the medium M to adhere to the conveyor portion BTa.

The main body frame 10 is disposed on a −X side of the conveyor belt BT. The main body frame 10 has a base material 11. The base material 11 is formed in, for example, a planar shape. The base material 11 has a first roller mounting portion 12, a second roller mounting portion 13, a third roller supporting portion 14, a support table 15, guides 16, and a fixing portion insertion hole 17.

The first roller mounting portion 12 is a linear cutout portion disposed to extend from an upper side of the base material 11 to a lower side (−Z direction) in the vertical direction. In the first roller mounting portion 12, a bearing portion 12a is disposed at an end on the −Z side. The bearing portion 12a rotatably supports a shaft member 35 disposed on the first roller 31 of the belt driving unit 30. Movement of the bearing portion 12a in the Y direction is regulated by mounting the bearing portion 12a on the first roller mounting portion 12.

The second roller mounting portion 13 is a linear cutout portion disposed in the +Y direction from the end side on the −Y side of the base material 11. A bearing portion 13a is disposed on the second roller mounting portion 13. The bearing portion 13a rotatably supports a shaft member 36 disposed on the second roller 32 of the belt driving unit 30. The bearing portion 13a is provided movably in the Y direction in a state in which the bearing portion 13a is mounted on the second roller mounting portion 13.

The third roller supporting portion 14 is an opening portion formed on a lower side of the base material 11. The third roller supporting portion 14 rotatably supports a shaft member 37 of the third roller 33 (will be described later). The third roller supporting portion 14 may have a bearing (not shown) for supporting the shaft member 37.

The support table 15 is disposed on a −X side surface of the base material 11 and disposed so as to protrude in the −X direction from the base material 11. The support table 15 has a support surface parallel to the XY plane. The support table 15 supports an air cylinder mechanism 41 of the applying unit 40.

The guides 16 are each disposed at each of the positions sandwiching the second roller mounting portion 13 in the Z direction. The guides 16 are each formed in a strip shape and are disposed in parallel with the Y direction. The upper and lower guides 16 guide a slider 44 of the applying unit 40 in the Y direction.

The fixing portion insertion hole 17 is disposed in a region sandwiched by the two guides 16 of the base material 11. The fixing portion insertion hole 17 is formed by penetrating the base material 11 in the X direction. The fixing portion insertion holes 17 are formed at, for example, four positions, respectively, but the present disclosure is not limited to this, and the fixing portion insertion holes 17 may be formed at three or less positions or at five or more positions.

The main body frame 20 is disposed on the +X side of the conveyor belt BT. The main body frame 20 has the same configuration as that of the main body frame 10 except that the main body frame 20 and the main body frame 10 are symmetric with respect to the X direction. Therefore, the main body frame 20 has a base material 21 just as the main body frame 10 does. Further, the base material 21 includes a first roller mounting portion 22, a second roller mounting portion 23, a third roller supporting portion 24, a support table 25, and guides 26. The first roller mounting portion 22, the second roller mounting portion 23, the third roller supporting portion 24, the support table 25, and the guides 26 and the first roller mounting portion 12, the second roller mounting portion 13, the third roller supporting portion 14, the support table 15, and the guides 16 are symmetric with respect to the X direction, respectively.

The belt driving unit 30 drives the conveyor belt BT. The belt driving unit 30 includes the first roller 31, the second roller 32, a third roller 33, and a drive mechanism 34.

The first roller 31 is formed in a columnar shape or a cylindrical shape. The first roller 31 has a shaft member 35. The shaft member 35 is disposed at the center portion of the first roller 31 and rotates integrally with the first roller 31. The shaft member 35 has a first end portion 35a and a second end portion 35b. The first end portion 35a protrudes in the −X direction from the end portion of the first roller 31 in the −X direction. The first end portion 35a is supported by the bearing portion 12a of the first roller mounting portion 12. The second end portion 35b protrudes in the +X direction from the end portion of the first roller 31 in the +X direction. The second end portion 35b is supported by a bearing portion 22b of the first roller mounting portion 22.

The first roller 31 is disposed parallel to the X direction. The movement of the bearing portions 12a and 22b in the Y direction is regulated by the first roller mounting portions 12 and 22. Therefore, the movement of the first roller 31 in the Y direction is regulated by the first end portion 35a being supported by the bearing portion 12a and the second end portion 35b being supported by the bearing portion 22b.

The second roller 32 is formed in a columnar shape or a cylindrical shape. The second roller 32 has a shaft member 36. The shaft member 36 is disposed at the center portion of the second roller 32 and rotates integrally with the second roller 32. The shaft member 36 has a first end portion 36a and a second end portion 36b. The first end portion 36a protrudes in the −X direction from the end portion of the second roller 32 in the −X direction. The first end portion 36a is supported by the bearing portion 13a of the second roller mounting portion 13. The second end portion 36b protrudes in the +X direction from the end portion of the second roller 32 in the +X direction. The second end portion 36b is supported by a bearing portion 23b of the second roller mounting portion 23.

The second roller 32 is disposed parallel to the X direction. The bearing portions 13a and 23b are provided movably in the Y direction by the second roller mounting portions 13 and 23. Therefore, the second roller 32 is provided movably in the Y direction by the first end portion 36a being supported by the bearing portion 13a and the second end portion 36b being supported by the bearing portion 23b. By adjusting the position of the second roller 32 in the Y direction, the tension of the conveyor belt BT can be adjusted.

The third roller 33 is formed in a columnar shape or a cylindrical shape. The third roller 33 has the shaft member 37. The shaft member 37 is disposed at the center portion of the third roller 33 and rotates integrally with the third roller 33. The shaft member 37 has a first end portion 37a and a second end portion 37b. The first end portion 37a protrudes in the −X direction from the end portion of the third roller 33 in the −X direction. The second end portion 37b protrudes in the +X direction from the end portion of the third roller 33 in the +X direction. In the third roller 33, the first end portion 37a is supported by the third roller supporting portion 14, and the second end portion 37b is supported by the third roller supporting portion 24. The third roller 33 is disposed on the −Z side of the return portion BTb of the conveyor belt BT.

The third roller 33 applies tension to the return portion BTb in the +Z direction. By applying the tension to the return portion BTb of the third roller 33, the tension of the entire conveyor belt BT can be adjusted. An inclination angle of the third roller 33 with respect to, for example, the X axis can be adjusted. By adjusting the inclination angle of the third roller 33 with respect to the X direction, the third roller 33 variably applies tension to the return portion BTb, eventually to the conveyor belt BT. For example, the inclination angle of the third roller 33 with respect to the X axis is adjusted to make it possible to change tensions applied to the return portion BTb, depending on positions in the X direction. Therefore, for example, when the conveyor belt BT partially extends in the Y direction due to use of the media conveyor mechanism 100 with time and when elongations of the conveyor belt BT on the +X side and the −X side are different from each other, the inclination angle of the third roller 33 with respect to the X axis can be adjusted such that higher tension is applied to the end portion side of the conveyor belt BT, the elongation of which is larger. This makes it possible to make the tension applied to the conveyor belt BT more uniform in the X direction.

The drive mechanism 34 is connected to the shaft member 35 of the first roller 31. The drive mechanism 34 rotates the first roller 31 around the X axis. As the drive mechanism 34, for example, a motor or the like is used. By connecting the drive mechanism 34, the first roller 31 becomes a driving roller, and the second roller 32 and the third roller 33 serve as driven rollers. The drive mechanism 34 is not limited to the configuration in which the drive mechanism 34 is connected to the first roller 31, and may be connected to one or both of the second roller 32 and the third roller 33, and may be connected to all of the first roller 31, the second roller 32, and the third roller 33.

Figure 4:
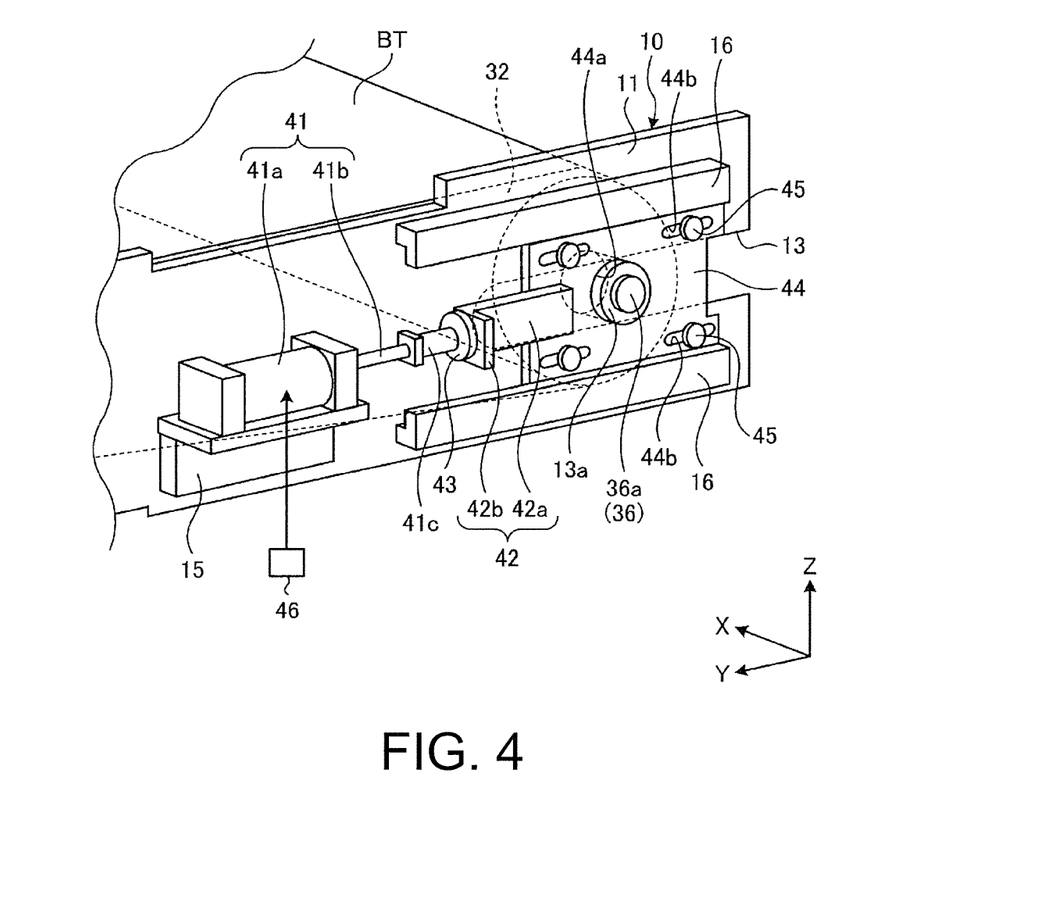
FIG. 4 is an enlarged perspective view showing a main part of the media conveyor mechanism.

The applying unit 40 applies force to the first end portion 36a of the shaft member 36 disposed on the second roller 32. FIG. 4 is an enlarged perspective view showing a main part of the media conveyor mechanism 100. As shown in FIG. 4, the applying unit 40 has the air cylinder mechanism 41, a transmitting member 42, a detection unit 43, a slider 44, and a fixing portion 45.

The air cylinder mechanism 41 is supported by the support table 15 of the base material 11. The air cylinder mechanism 41 has a main body portion 41a and a rod portion 41b. The main body portion 41a adjusts the pressure applied to the rod portion 41b by a control unit (not shown). The rod portion 41b reciprocates in the Y directions according to a pressure applied by the main body portion 41a. A regulator 46 is connected to the main body portion 41a. The regulator 46 can adjust a pressure in the main body portion 41a. The regulator 46 is adjusted to a constant value to make it possible to cause the main body portion 41a to apply a constant pressure to the rod portion 41b. Even when the regulator 46 is not used, the main body portion 41a can apply a constant pressure to the rod portion 41b.

The transmitting member 42 transmits the force from the air cylinder mechanism 41 to the slider 44. The transmitting member 42 is formed in a plate shape and is bent to have an L shape in plan view. The transmitting member 42 has a fixing portion 42a and a receiving portion 42b. The fixing portion 42a is fixed to the slider 44. The receiving portion 42b is a portion which receives force from the air cylinder mechanism 41. The receiving portion 42b is disposed perpendicular to the moving direction of the rod portion 41b.

The detection unit 43 is held between a distal end portion 41c of the rod portion 41b and the receiving portion 42b of the transmitting member 42. For example, a strain gauge or the like is used as the detection unit 43. The detection unit 43 detects a magnitude of force given by the distal end portion 41c of the rod portion 41b.

The slider 44 is formed in a planar shape and is disposed between the two guides 16. The slider 44 can reciprocate in the Y direction along the guides 16 by the force from the air cylinder mechanism 41. The slider 44 has a bearing insertion portion 44a and a long hole portion 44b. In the bearing insertion portion 44a, the bearing portion 13a disposed on the second roller mounting portion 13 is inserted. The slider 44 moves in the Y direction integrally with the bearing portion 13a by inserting the bearing portion 13a into the bearing insertion portion 44a. The long hole portion 44b is disposed around the bearing insertion portion 44a. When the slider 44 is disposed between the two guides 16, the long hole portion 44b is disposed at a position overlapping the fixing portion insertion hole 17 of the base material 11.

The fixing portion 45 fixes the slider 44 to the base material 11. For example, a bolt or the like is used as the fixing portion 45. The fixing portion 45 is inserted to penetrate the long hole portion 44b of the slider 44 and the fixing portion insertion hole 17 of the base material 11. The fixing portion 45 fixes the slider 44 to the base material 11 to fix the position of the second roller 32 in the Y direction.

When the slider 44 is fixed to the base material 11 by the fixing portion 45, the second roller 32 is in a fixed state in which its position in the Y direction is fixed. When the slider 44 is not fixed to the base material 11, the second roller 32 is in a movable state in which the second roller 32 can move in the Y direction. Therefore, the second roller 32 can switch between the movable state and the fixed state by switching whether or not the slider 44 is fixed to the base material 11 by the fixing portion 45.

The applying unit 50 applies force to the second end portion 36b of the second roller 32. The applying unit 50 has the same configuration as that of the applying unit 40 except that the applying unit 50 and the applying unit 40 are symmetric with respect to the X direction. Therefore, like the applying unit 40, the applying unit 50 includes an air cylinder mechanism 51 (including a main body portion 51a, a rod portion 51b, and a distal end portion 51c), a transmitting member 52 (including a fixing portion 52a and a receiving portion 52b), a detection unit 53, a slider 54 (including a bearing insertion portion 54a and a long hole portion 54b), a fixing portion 55, and a regulator 56.

The air cylinder mechanism 51, the transmitting member 52, the detection unit 53, the slider 54, the fixing portion 55, and the regulator 56 and the air cylinder mechanism 41 (and the regulator 46), the transmitting member 42, the detection unit 43, the slider 44, and the fixing portion 45 are symmetric with respect to the X direction. The air cylinder mechanism 41 and the air cylinder mechanism 51 are synchronously driven to make it possible to apply constant equal force to the first end portion 36a and the second end portion 36b of the shaft member 36 of the second roller 32.

Figure 5:
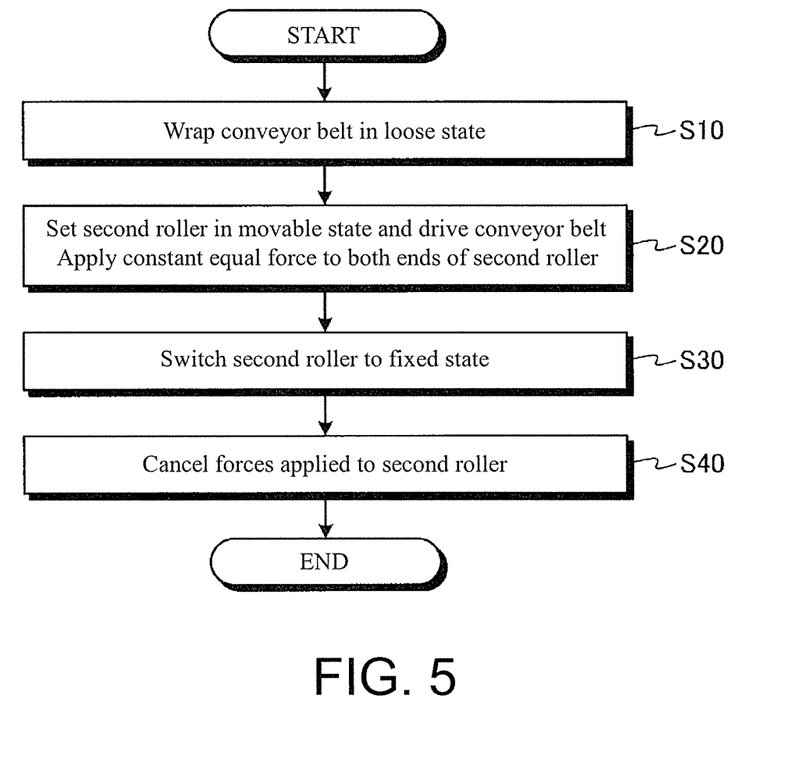
FIG. 5 is a flowchart showing a method of mounting a conveyor belt.
Figure 6:
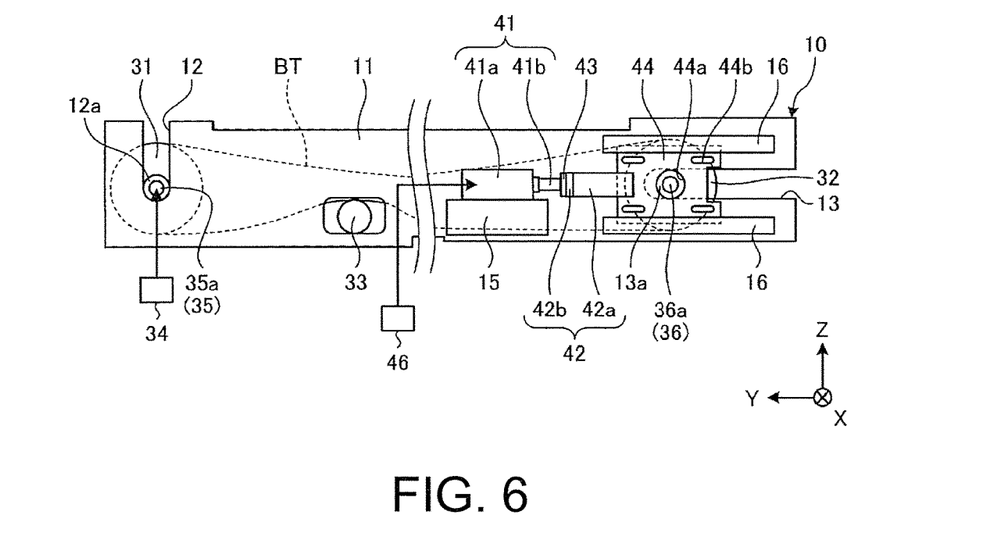
FIG. 6 is a diagram showing a mounting process of the conveyor belt.
Figure 7:
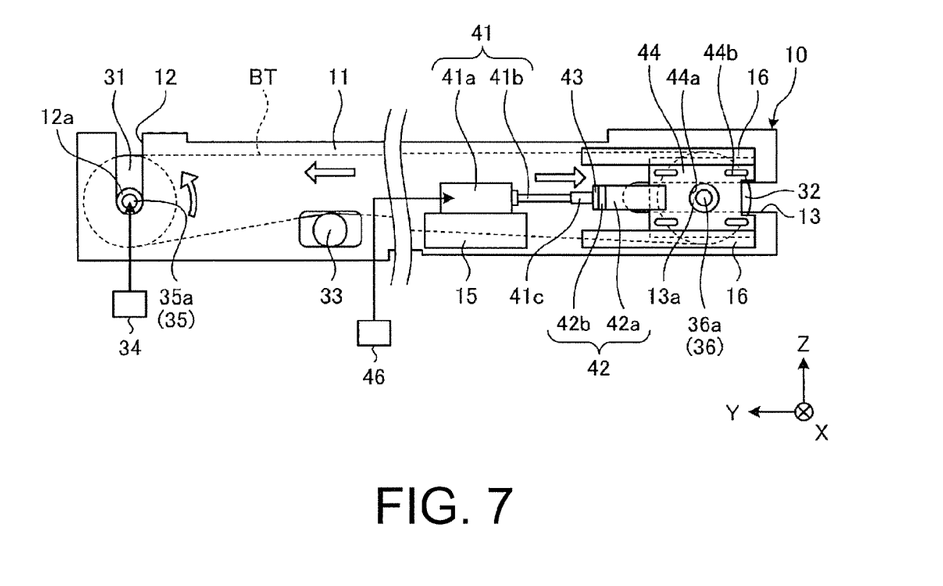
FIG. 7 is a diagram showing a mounting process of the conveyor belt.

Next, a method of mounting a conveyor belt which mounts the conveyor belt BT on the above-described media conveyor mechanism 100 will be described. FIG. 5 is a flowchart showing a method of mounting the conveyor belt BT. FIGS. 6 to 9 are diagrams showing mounting processes of the conveyor belt BT. First, the conveyor belt BT is wrapped in a loose state between the first roller 31 and the second roller 32 (step S10). In step S10, for example, the first roller 31 and the second roller 32 are removed from the main body frames 10 and 20, and the conveyor belt BT is wrapped around the first roller 31 and second roller 32. In this state, the second roller 32 is set in a movable state, i.e., the second roller 32 is mounted on the second roller mounting portions 13 and 23, and the sliders 44 and 54 are not fixed to the base materials 11 and 21. After the second roller 32 is mounted, the first roller 31 is mounted on the first roller mounting portion 12 and 22. As a result, as shown in FIG. 6, the first roller 31 and the second roller 32 are mounted on the main body frames 10 and 20, and the conveyor belt BT is wrapped in a loose state.

Figure 8:
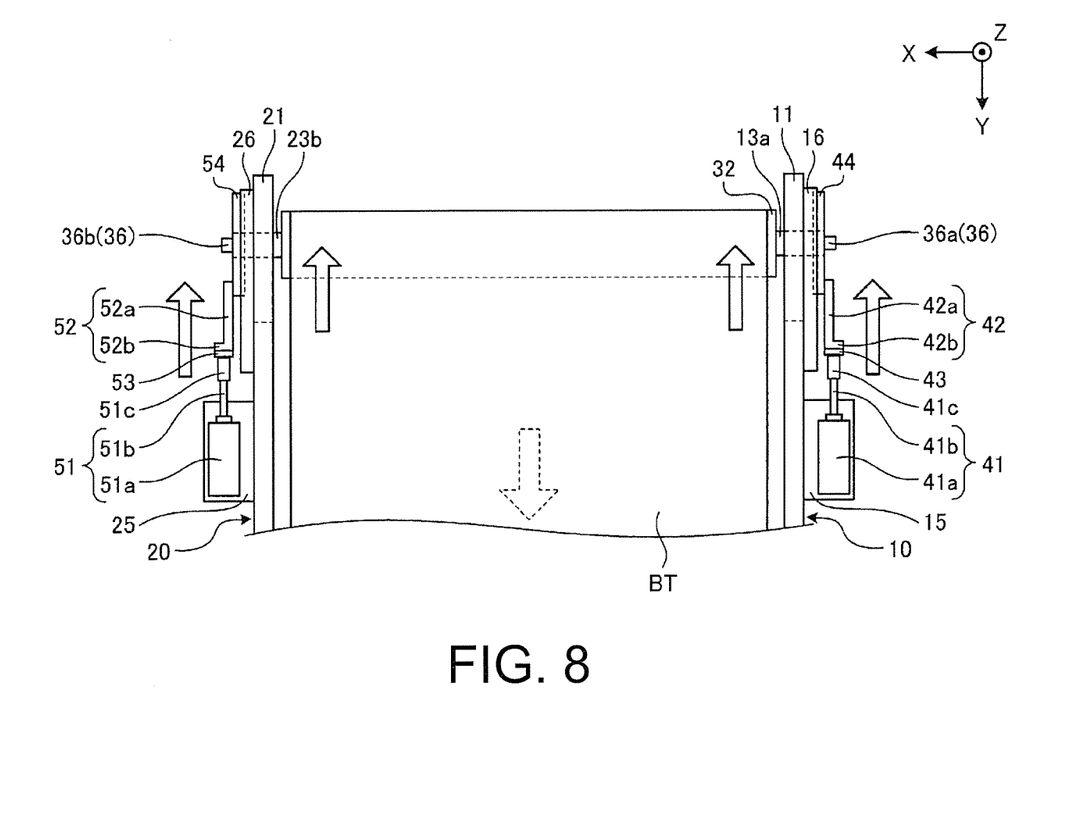
FIG. 8 is a diagram showing a mounting process of the conveyor belt.
Figure 9:
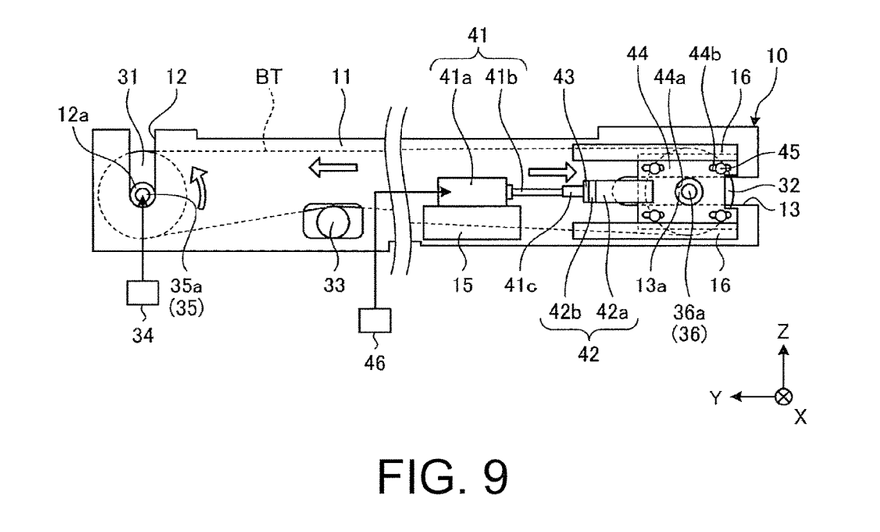
FIG. 9 is a diagram showing a mounting process of the conveyor belt.

Next, when the second roller 32 is set in a movable state and the conveyor belt BT is driven, the applying unit 40 and the applying unit 50 apply constant equal force to the first end portion 36a and the second end portion 36b of the shaft member 36 of the second roller 32 in the −X direction (step S20). In step S20, first, the first roller 31 is rotated by adding the drive mechanism 34. By the rotation of the first roller 31, the conveyor belt BT rotates and moves while being loosened. After the conveyor belt BT is rotated and moved, the air cylinder mechanism 41 and the air cylinder mechanism 51 are synchronously driven. The air cylinder mechanisms 41 and 51 apply constant equal pressing force to the rod portions 41b and 51b in the −Y direction. As a result, the sliders 44 and 54 are pressed with the constant equal force in the −Y direction. Therefore, constant equal force is applied to the first end portion 36a and the second end portion 36b in the −Y direction via the sliders 44 and 54 and the bearing portions 13a and 23b. This force allows the second roller 32 to move in the −Y direction and tension to be applied to the conveyor belt BT. As shown in FIG. 8, since a constant equal force is applied to the first end portion 36a and the second end portion 36b in the −Y direction, constant equal tension is applied to both the ends of the conveyor belt BT in the X direction.

Next, the second roller 32 is switched from the movable state to the fixed state in a state where the force is applied by the applying units 40 and 50 (step S30). Step S30 is performed when a moving distance of the second roller 32 in the −Y direction is a minute value or when the movement of the second roller 32 in the −Y direction is stopped. In step S30, the sliders 44 and 54 are fixed to the base materials 11 and 21 by the fixing portions 45 and 55. According to step S30, the second roller 32 is in a fixed state in a state in which constant equal tension is applied to both the ends of the conveyor belt BT in the X direction. Therefore, the conveyor belt BT is supported by the first roller 31 and the second roller 32 in a state where the tensions at both the ends in the X direction are equal to each other.

Next, the forces applied from the applying units 40 and 50 to the second roller 32 are canceled (step S40). In step S40, driving of the air cylinder mechanisms 41 and 51 is stopped to stop the rotation of the first roller 31 caused by the drive mechanism 34. In step S40, the second roller 32 is fixed at a position where the second roller 32 is in the fixed state by the fixing portions 45 and 55. Thus, the operation of mounting the conveyor belt BT on the media conveyor mechanism 100 is completed.

As described above, in the media conveyor mechanism 100 according to the embodiment, the applying units 40 and 50 can apply the constant equal force in the −Y direction to both the ends of the second roller 32 in the X direction. Therefore, when the conveyor belt BT is mounted on the first roller 31 and the second roller 32, tension can be applied to both the ends of the conveyor belt BT in the X direction with constant equal force. This can suppress the conveyor belt BT from meandering or being deformed.

In addition, in the method of mounting the conveyor belt BT according to the embodiment, since the second roller 32 is switched from the movable state to the fixed state while the state in which the applying units 40 and 50 apply constant equal force in the −Y direction to both the ends of the second roller 32 in the X direction is maintained, the conveyor belt BT is mounted on the first roller 31 and the second roller 32 in a state in which tension is applied to both the ends in the X direction with constant equal force. Thus, the conveyor belt BT can be suppressed from meandering or being deformed.

In addition, in the media conveyor mechanism 100 according to the embodiment, since the applying units 40 and 50 include the air cylinder mechanism 41 applying a force to the second roller 32 and the regulator 46 adjusting an air pressure of the air cylinder mechanism 41 to a constant value, the applying units 40 and 50 can more reliably apply constant equal force to both the ends of the second roller 32 in the X direction.

Since the media conveyor mechanism 100 according to this embodiment further includes the third roller 33 which is in contact with the portion of the conveyor belt BT between the first roller 31 and the second roller 32 and which variably applies tension to the conveyor belt BT, even though deformation or the like of the conveyor belt BT occurs in use with time, the tension can be adjusted.

Further, since the media conveyor mechanism 100 according to the embodiment further includes the detection unit 43 that detects a magnitude of force applied to the second roller 32 by the applying units 40 and 50, it can be detected whether or not constant equal force is applied to both the ends of the second roller 32 in the X direction. Further, by employing a configuration in which the detection units 43 and 53 are sandwiched between the rod portions 41b and 51b of the air cylinder mechanisms 41 and 51 and the receiving portions 42b and 52b of the transmitting members 42 and 52, magnitudes of force applied from the distal end portions 41c and 51c of the rod portions 41b and 51b of the air cylinder mechanisms 41 and 51, i.e., a magnitude of force applied to the end portion of the second roller 32 in the X direction can be detected. In this manner, the detection units 43 and 53 can perform highly accurate detection.

The technical scope of the present disclosure is not limited to the above-described embodiment, and appropriate modifications can be made without departing from the spirit of the present disclosure. For example, the above embodiment has been described with reference to the configuration in which the second roller 32 is pressed from the air cylinder mechanisms 41 and 51 arranged on the +Y side of the second roller 32 to apply force to the second roller 32. However, the embodiment is not limited to the configuration. For example, the applying units 40 and 50 may be configured to apply force to the second roller 32 by pulling the second roller 32 from the −Y side to the −Y side.

Further, the above embodiment has been described with reference to the configuration in which the detection units 43 and 53 are disposed on the receiving portions 42b and 52b of the transmitting members 42 and 52. However, the embodiment is not limited to the configuration. For example, a configuration in which pressures applied from the main body portions 41a and 51a of the air cylinder mechanisms 41 and 51 to the rod portions 41b and 51b are detected may be used.

The above embodiment has been described with reference to the configuration in which the third roller 33 is disposed. However, the embodiment is not limited to the configuration, and the embodiment may employ a configuration in which the third roller 33 is omitted. Further, the above embodiment has been described with reference to the configuration in which the regulators 46 and 56 are connected to the air cylinder mechanisms 41 and 51. However, the embodiment is not limited to the configuration, and may employ a configuration in which the regulators 46 and 56 are omitted.

What is claimed is:

1. A media conveyor mechanism for a printing apparatus comprising:

an endless conveyor belt conveying a medium in a first direction;

a belt driving unit having a first roller and a second roller which are arranged at an interval in the first direction and parallel to a second direction orthogonal to the first direction, on which the conveyor belt is wrapped, and at least one of which drives the conveyor belt, the first roller being fixed at a predetermined position in the first direction, and the second roller being switchable between a movable state in which the second roller is movable in the first direction and a fixed state in which a position of the second roller in the first direction is fixed; and an applying unit which applies a force which is a constant equal force to both ends of the second roller in a direction opposite to the first direction, wherein the applying unit includes an air cylinder mechanism applying the force to the second roller and a regulator adjusting an air pressure of the air cylinder mechanism to a constant pressure, and the applying unit further includes a detecting unit detecting a magnitude of the force applied to the second roller.

2. The media conveyor mechanism for a printing apparatus according to claim 1, further comprising a third roller which is in contact with a portion of the conveyor belt between the first roller and the second roller and variably applies a tension to the conveyor belt.

3. A method of mounting the conveyor belt which mounts the conveyor belt on the media conveyor mechanism for a printing apparatus according to claim 1, comprising:

wrapping the conveyor belt in a loose state between the first roller and the second roller;

applying the force to both ends of the second roller in the second direction in a direction away from the first roller in the first direction by the applying unit in a state in which the second roller is set in the movable state and the conveyor belt is driven;

switching the second roller from the movable state to the fixed state while a state in which the force is applied by the applying unit is maintained when a predetermined tension is applied to the conveyor belt; and canceling the state in which the force is applied to the second roller by the applying unit after the second roller is switched to the fixed state.

* * * * *